US006853565B1

United States Patent
Liao

(10) Patent No.: US 6,853,565 B1
(45) Date of Patent: Feb. 8, 2005

(54) VOLTAGE OVERSHOOT REDUCTION CIRCUITS

(75) Inventor: Chiawei Liao, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 10/444,489

(22) Filed: May 23, 2003

(51) Int. Cl.[7] .............................................. H02H 7/122
(52) U.S. Cl. ............................ 363/56.11; 363/56.05; 363/49
(58) Field of Search .......................... 363/16, 40, 41, 363/42, 56.03, 56.04, 56.05, 56.08, 56.11, 49, 56.12; 323/901, 902

(56) References Cited

U.S. PATENT DOCUMENTS

| | | | |
|---|---|---|---|
| 4,573,113 A | 2/1986 | Bauman | 363/48 |
| 4,825,132 A * | 4/1989 | Gritter | 363/42 |
| 5,610,803 A | 3/1997 | Malik | 363/21.09 |
| 5,973,980 A | 10/1999 | Tiede et al. | 365/226 |
| 6,154,375 A | 11/2000 | Majid et al. | 363/16 |
| 6,154,377 A | 11/2000 | Balakrishnan et al. | 363/21.01 |

* cited by examiner

Primary Examiner—Jessica Han
(74) Attorney, Agent, or Firm—Fish & Neave LLP; Garry J. Tuma

(57) ABSTRACT

Feedback circuits capable of preventing output voltage overshoot in closed-loop DC regulated power supplies are presented. The circuits employ hysteresis at the input of an operational amplifier to improve the response time of the feedback circuits to a rising output voltage reaching a threshold. The feedback circuits substantially reduce, if not prevent, output voltage overshoot during start-up and hard and soft output shorts.

21 Claims, 9 Drawing Sheets

VOLTAGE OVERSHOOT REDUCTION CIRCUITS

BACKGROUND OF THE INVENTION

This invention relates to circuits that reduce output voltage overshoot. More particularly, this invention relates to integrated circuits that reduce output voltage overshoot in opto-coupler controlled closed-loop DC power supplies.

An output voltage overshoot is a transient rise in output voltage beyond a specified output voltage level. Excessive overshoot can cause system failure and can damage both the power supply and loads coupled to the power supply. Output overshoot typically occurs when the power supply is first turned on or when the power supply output is overloaded or inadvertently shorted to ground or to a voltage less than the regulated output voltage (i.e., shorted to an "undervoltage") and then released. In sum, the following three conditions can cause output voltage overshoot: start-up, output short to ground (hard short), and output short to an undervoltage (soft short).

Known closed-loop isolated power supplies include feedback circuitry that regulates the output voltage (i.e., maintains the output voltage at a specified level). Such feedback circuitry commonly includes a high gain amplifier and an opto-coupler. When the power supply output voltage rises above a threshold, the amplifier drives the opto-coupler, which provides one or more signals to a power supply control circuit that stops the rise in output voltage and allows the output voltage to return to its specified level. However, the response time of basic feedback circuitry is often slow. In particular, the slew time of the amplifier output is often longer than the slew time of the rising output voltage. Slew time is the time it takes a signal to make a transition. Thus, basic feedback circuitry is generally unable to prevent potentially large output voltage overshoots from occurring, thus only belatedly being able to regulate the overshot output voltage back down to the desired level.

Improved feedback circuits are also known. For example, soft-start circuits are known that limit or prevent overshoot at start-up. Soft-start circuits gradually apply power to the output to slow the rising output voltage. The feedback circuitry then has sufficient time to respond to the output voltage as it reaches the specified level. These circuits, however, are ineffective against soft and hard output shorts.

Feedforward slew rate detector circuits and overvoltage comparator circuits are also known. These circuits generate and route signals to control circuitry via a fast-path around the slower feedback amplifier path in response to the output voltage reaching a threshold. However, output voltage ripples, which typically occur on the output of DC power supplies, are often of sufficient magnitude to exceed thresholds used in the fast-paths of such circuits and can thus cause the power supply output to oscillate.

Clamping amplifier output circuits are also known in which the voltage swing on the feedback amplifier's output is limited in order to provide a quicker response to output overshoot. However, even the limited voltage swings of known clamping circuits are still too large to allow the circuit to respond quickly enough to prevent overshoot, thus resulting in only marginal improvement.

In sum, no known closed-loop power supply feedback circuit is effective against all three common overshoot conditions mentioned above.

In view of the foregoing, it would be desirable to be able to provide a circuit that reduces, if not eliminates, output voltage overshoot in an opto-coupler controlled closed-loop isolated power supply under any of several conditions.

It would also be desirable to be able to provide an integrated circuit that responds quickly to a threshold being met.

SUMMARY OF THE INVENTION

It is an object of this invention to provide a circuit that reduces, if not eliminates, output voltage overshoot in an opto-coupler controlled closed-loop isolated power supply under any of several conditions.

It is also an object of this invention to provide an integrated circuit that responds quickly to a threshold being met.

In accordance with the invention, a circuit is provided that substantially reduces, if not eliminates, output voltage overshoot by responding quickly to a rising output voltage reaching a threshold. The circuit includes an amplifier having an input whose voltage swing indicates that an output voltage has risen to a threshold level. The invention improves response time by substantially reducing the amount of voltage swing needed on that amplifier input to indicate that the output voltage has reached the threshold. The amount of voltage swing is reduced by adding hysteresis to a reference voltage coupled to another input of the amplifier.

Methods of substantially reducing, if not eliminating, output voltage overshoot and of responding quickly to a threshold being met are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

To better understand the invention and its advantages, several known techniques for preventing or limiting output voltage overshoot, and their disadvantages, are first described.

Figure 1:
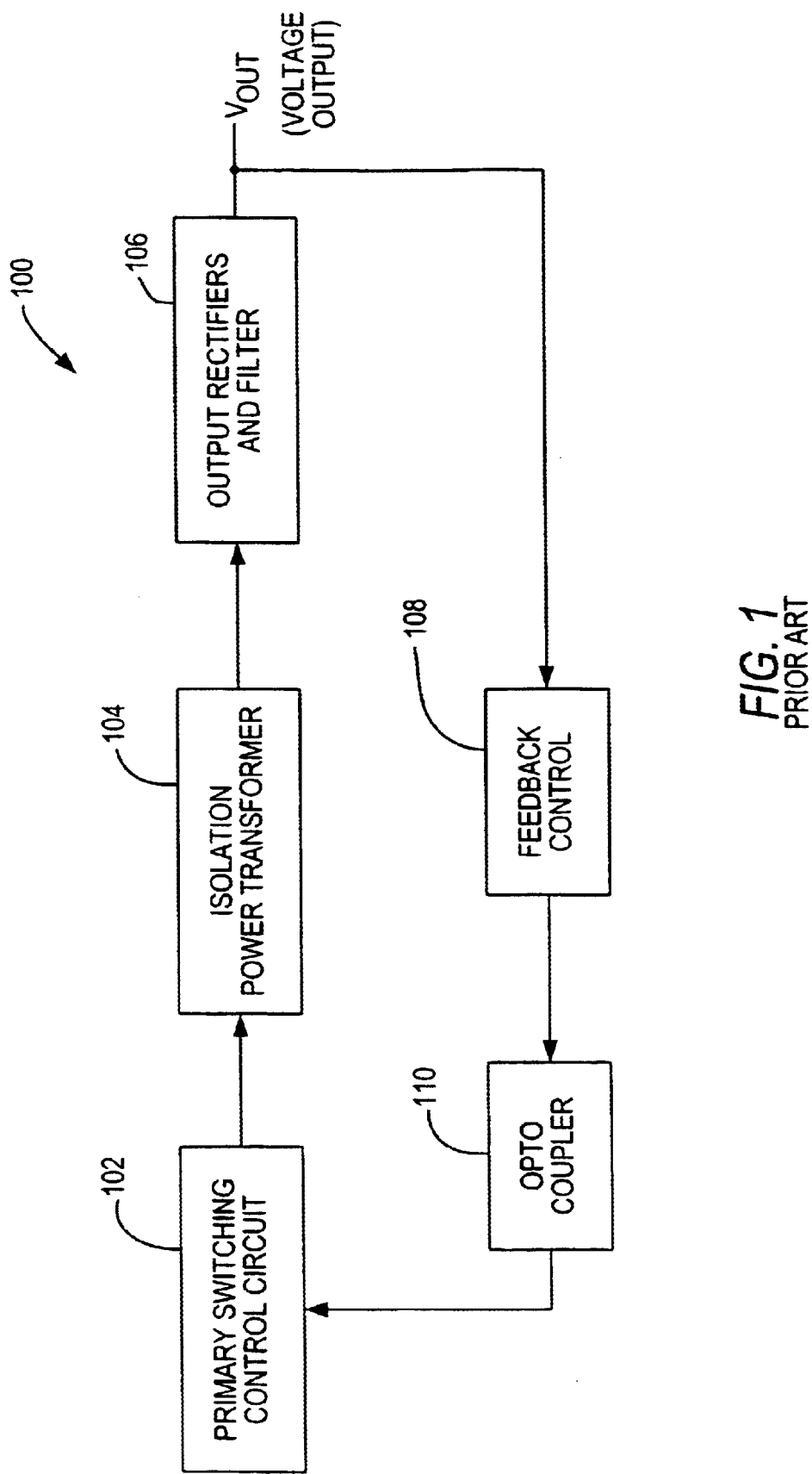
FIG. 1 is a block diagram of a typical opto-coupler controlled closed-loop DC power supply.

FIG. 1 represents a known opto-coupler controlled closed-loop switched-mode DC power supply 100. Switched-mode power supplies are commonly used because of their high efficiency and good output regulation. Power supply 100 includes primary switching control circuit 102, isolation power transformer 104, output rectifiers and filter 106, feedback control 108, and opto-coupler 110. The duty cycle of switching control circuit 102 controls the voltage level of the power supply output at node VOUT. Control circuit 102 typically converts low frequency voltage to high frequency voltage. Isolation transformer 104 typically steps high input voltage down to low output voltage and isolates the high voltage from the power supply output. The high frequency, low output AC voltage from transformer 104 is typically rectified and filtered at 106 to produce a DC output voltage at node VOUT. Feedback control 108 typically regulates the voltage at node VOUT by sensing the output voltage level and generating and forwarding one or more control signals to switching control circuit 102 via opto-coupler 110 when the voltage at node VOUT exceeds or drops below a threshold level. The control signals affect the duty cycle of control circuit 102, which affects the amount of current provided to the output, which in turn affects the output voltage level. Opto-coupler 110 provides high primary-to-secondary circuit isolation to prevent internal high voltage potentials from reaching the power supply output. The input and output of opto-coupler 110 are optically coupled to each other (i.e., there is no electrical or physical connection between them). This results in extremely high input-to-output DC isolation.

Figure 2:
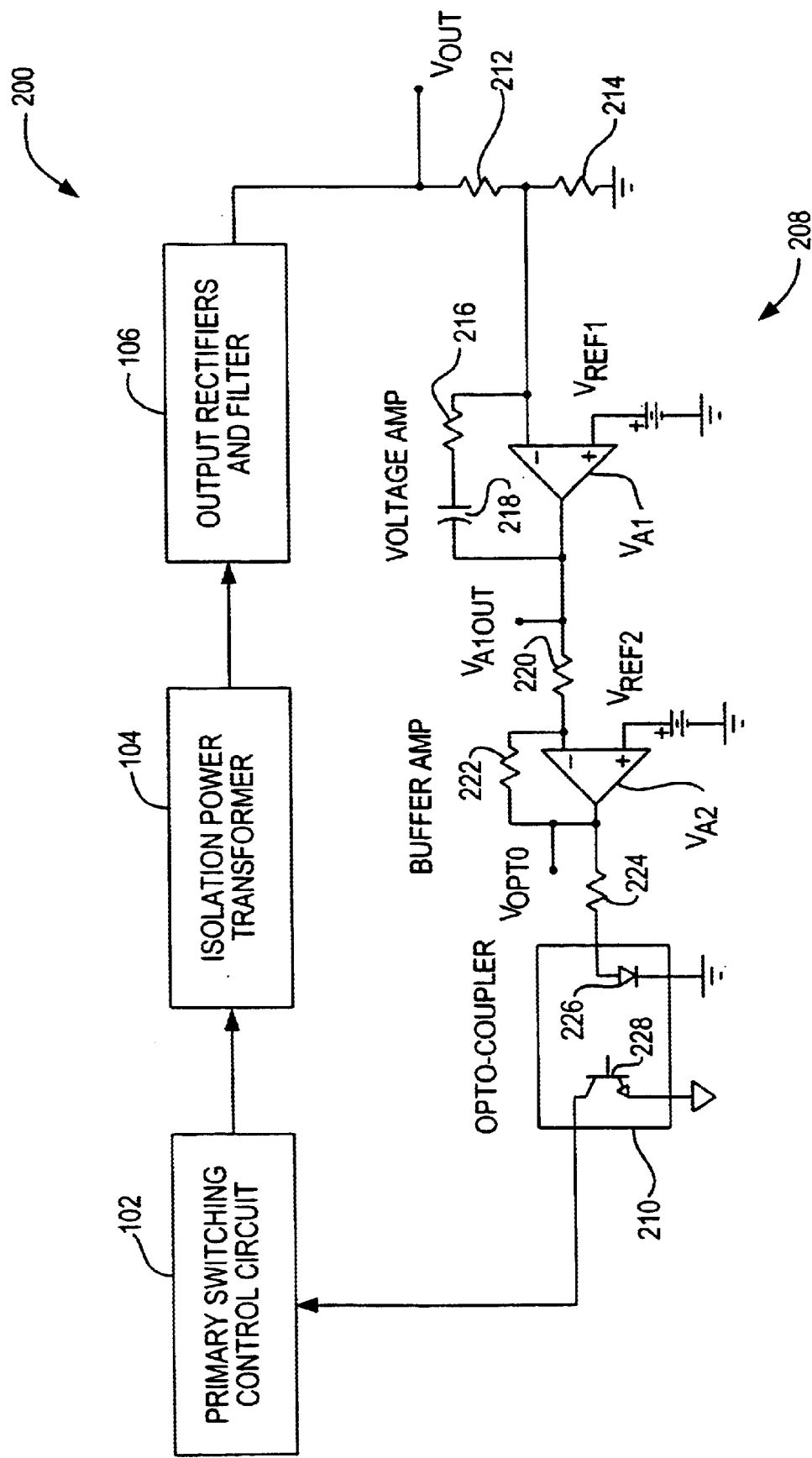
FIG. 2 is a block circuit diagram of a known embodiment of the feedback control of the power supply of FIG. 1.

FIG. 2 represents known embodiments of a feedback control circuit and an opto-coupler in a closed-loop power supply. Feedback control circuit 208 includes output divider resistors 212 and 214, high gain voltage amplifier VA1, resistor 216 and capacitor 218, resistor 220, optional fixed low DC gain buffer amplifier VA2, and resistors 222 and 224. VA1 and VA2 may be general purpose operational amplifiers (op-amps) and may be the same off-the-shelf part. Reference voltage VREF1 is coupled to the non-inverting input of amplifier VA1, while reference voltage VREF2 is coupled to the non-inverting input of amplifier VA2. The gain of amplifier VA2 is "K," where the value of resistor 222 is equal to K times the value of resistor 220. Opto-coupler 210 includes light emitting diode (LED) 226 and NPN light-sensitive transistor 228. LED 226 and transistor 228 are optically coupled such that the conductance of transistor 228 is dependent upon the output luminance of LED 226.

At start-up or during "output short release" (i.e., either a hard or soft output short), node VA1OUT is "high" (i.e., in a high voltage state, also referred to as a logical or binary "1") and node VOPTO is "low" (i.e., in a low voltage state, also referred to as a logical or binary "0"). This drives the output of opto-coupler 210 low (e.g., at or near 0 volts), permitting control circuit 102 to operate at its maximum duty cycle. Maximum current is thus delivered to output VOUT. As VOUT rises toward the supply's specified voltage level, voltage amplifier VA1 senses, pulling node VA1OUT low. Amplifier VA2 then switches when node VA1OUT goes below VREF2. Node VOPTO then goes high, driving the output of opto-coupler 210 high, which reduces the duty cycle of control circuit 102. This results in a reduction of current to node VOUT, which prevents further increases in output voltage level and ultimately maintains the output voltage at the regulated level.

However, the falling slew time at node VA1OUT is longer than the rising slew time at node VOUT. Slew time is the time it takes a signal to make a transition. Thus, feedback control circuit 208 does not respond quickly enough to prevent a high output overshoot from occurring at node VOUT. The slew time at node VA1OUT is limited by voltage divider resistors 212 and 214 and by compensation network resistor 216 and capacitor 218. In particular, the discharging of capacitor 218, which is required in order to pull down the voltage at node VA1OUT, is limited by resistors 212 and 214 and the voltage at node VOUT. Accordingly, feedback control circuit 208 is largely unable to prevent output voltage overshoot.

Figure 3:
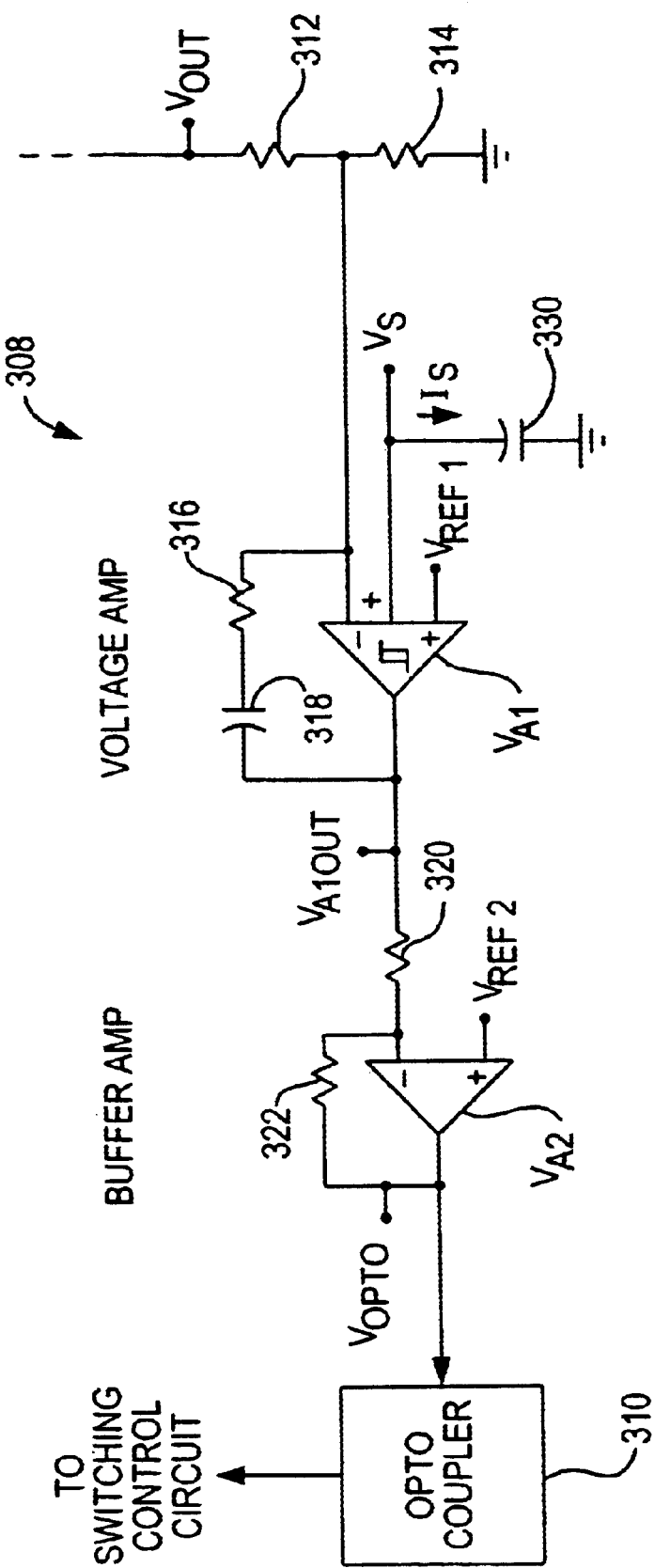
FIG. 3 is a circuit diagram of a known soft-start embodiment of the feedback control of the power supply of FIG. 1.

FIG. 3 shows a known feedback control circuit that addresses output voltage overshoot at start-up. Soft-start feedback control circuit 308 is coupled to opto-coupler 310 and is typically an integrated circuit that includes output divider resistors 312 and 314, high gain voltage amplifier VA1, resistor 316 and capacitor 318, resistor 320, optional fixed low DC gain buffer amplifier VA2 and resistor 322. Feedback control circuit 308 also includes external capacitor 330 coupled to a non-inverting third input of amplifier VA1. (Although not shown in FIG. 3, feedback control circuit 308 and opto-coupler 310 are coupled to a power supply's primary circuits, such as, for example, switching control circuit 102, isolation power transformer 104, and output rectifiers/filter 106 of FIG. 1).

Feedback control circuit 308 causes output voltage at node VOUT to rise gradually. The voltage at node Vs is the reference voltage of amplifier VA1 until Vs rises to the value of VREF1, at which time, VREF1 becomes the reference voltage. The rising slew rate of the voltage at node VOUT is controlled by the preset current Is and capacitor 330 in accordance with T=C330(dV)/Is, where T is time and dV is the output voltage swing. By setting VOUT's rising slew rate slow, output voltage overshoot can be prevented or substantially limited—but only if capacitor 330 begins charging from a discharged state.

Feedback control circuit 308 has a number of disadvantages. First, because capacitor 330 is external to the integrated circuit, an input/output (I/O) package pin is required to connect capacitor 330 to feedback control circuit 308. As is known, unused I/O pins can be rare in high density integrated circuit packages.

Furthermore, feedback control circuit 308 cannot prevent output overshoots from occurring during either a soft or hard output short, because soft-start capacitor 330 remains charged after start-up. This prevents the voltage at node Vs from being the low (below VREF1), slowly rising reference voltage it was during start-up. Moreover, even if capacitor 330 were reset (i.e., discharged) in response to an output short release, feedback circuit 308 still would not perform satisfactorily because the voltage at VOUT would collapse to ground following the capacitor discharge and voltage drop at Vs. This collapse could cause, for example, output oscillation or data loss.

Figure 4:
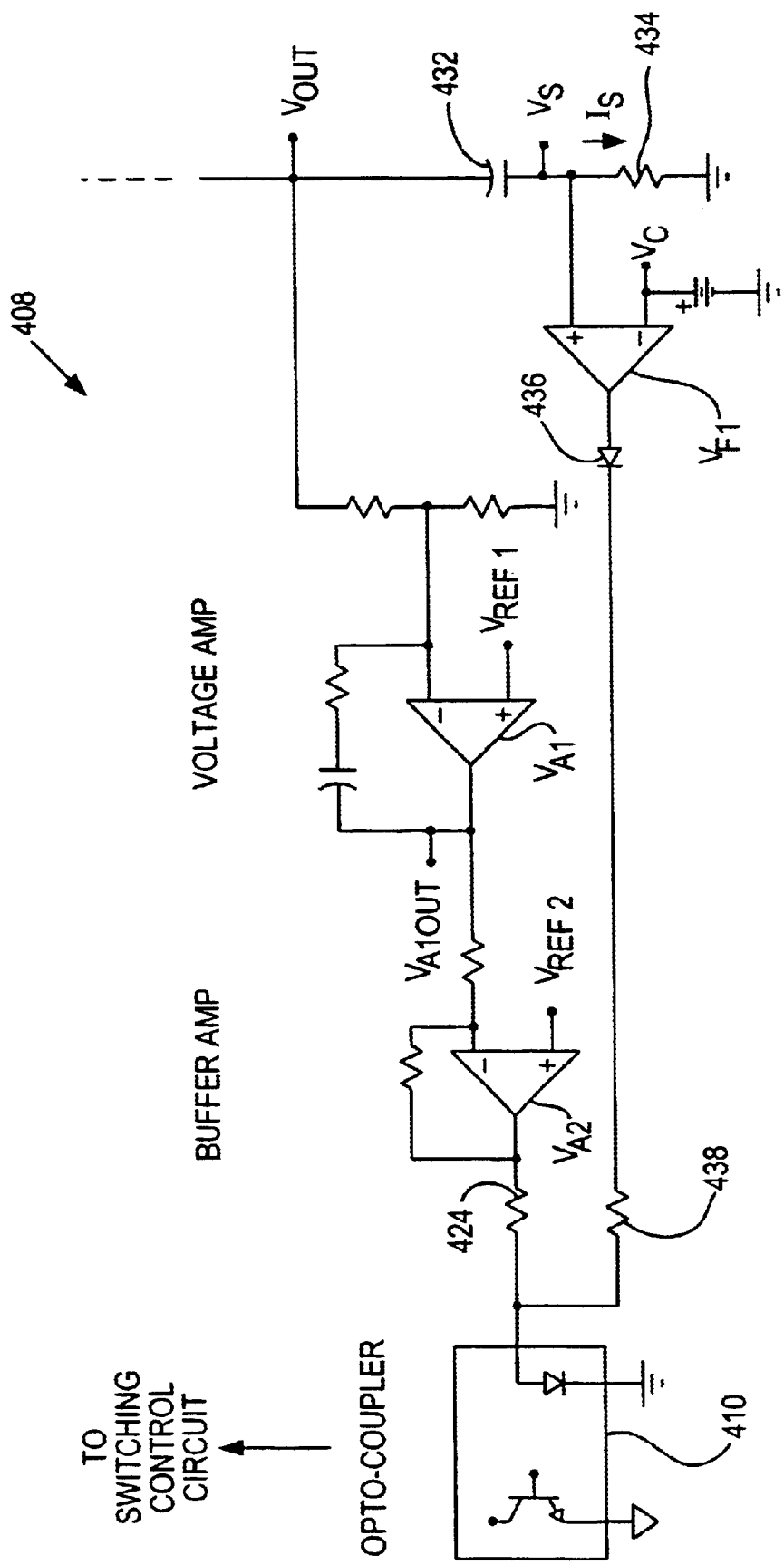
FIG. 4 is a circuit diagram of a known feedforward embodiment of the feedback control of the power supply of FIG. 1.

FIG. 4 shows a known feedforward slew rate detector 408 coupled to opto-coupler 410. Detector 408 includes capacitor 432, resistor 434, amplifier VF1, diode 436, and resistor 438 (note that resistors 438 and 424 can both be replaced with a resistor inside of opto-coupler 410). Capacitor 432 and resistor 434 are typically external components coupled to the integrated circuit detector 408. Reference voltage Vc is coupled to the inverting input of amplifier VF1. As the voltage at output node VOUT slews up at full speed during start-up or output short release, the voltage at node Vs will follow the voltage at node VOUT because of capacitor-coupling until capacitor 432 reaches the reference voltage Vc. Amplifier VF1 then activates and "feeds-forward" a control signal (bypassing the slower amplifier VA1-VA2 path) directly to opto-coupler 410. Opto-coupler 410 feeds the control signal to switching control circuitry (not shown in FIG. 4), which reduces current to node VOUT, thus slowing or stopping the voltage rise at node VOUT. The output slew rate (and thus the output overshoot) can be controlled by selecting appropriate values for capacitor 432 and resistor 434 in accordance with dV/dT=Is/C432, where dV/dT is the output slew rate and Is=Vc/R434.

Feedforward slew rate detector 408 has a number of disadvantages. First, it requires many components in addition to the amplifier VA1-VA2 path components. Second, an input/output (I/O) package pin is required to connect capacitor 432 and resistor 434 to integrated circuit detector 408. As mentioned previously, unused I/O pins can be rare in high density integrated circuit packages. Furthermore, output voltage ripples at node VOUT are directly coupled to the non-inverting input of amplifier VF1. As the trend in output voltage up-level magnitude continues to decrease (up-levels as low as about 1 volt are becoming more common in many electronics systems), the reference voltage at node Vc has to be set at an accordingly lower level. Voltage ripples caused by large load changes may thus be of sufficient magnitude to erroneously activate amplifier VF1, causing output oscillation.

Figure 5:
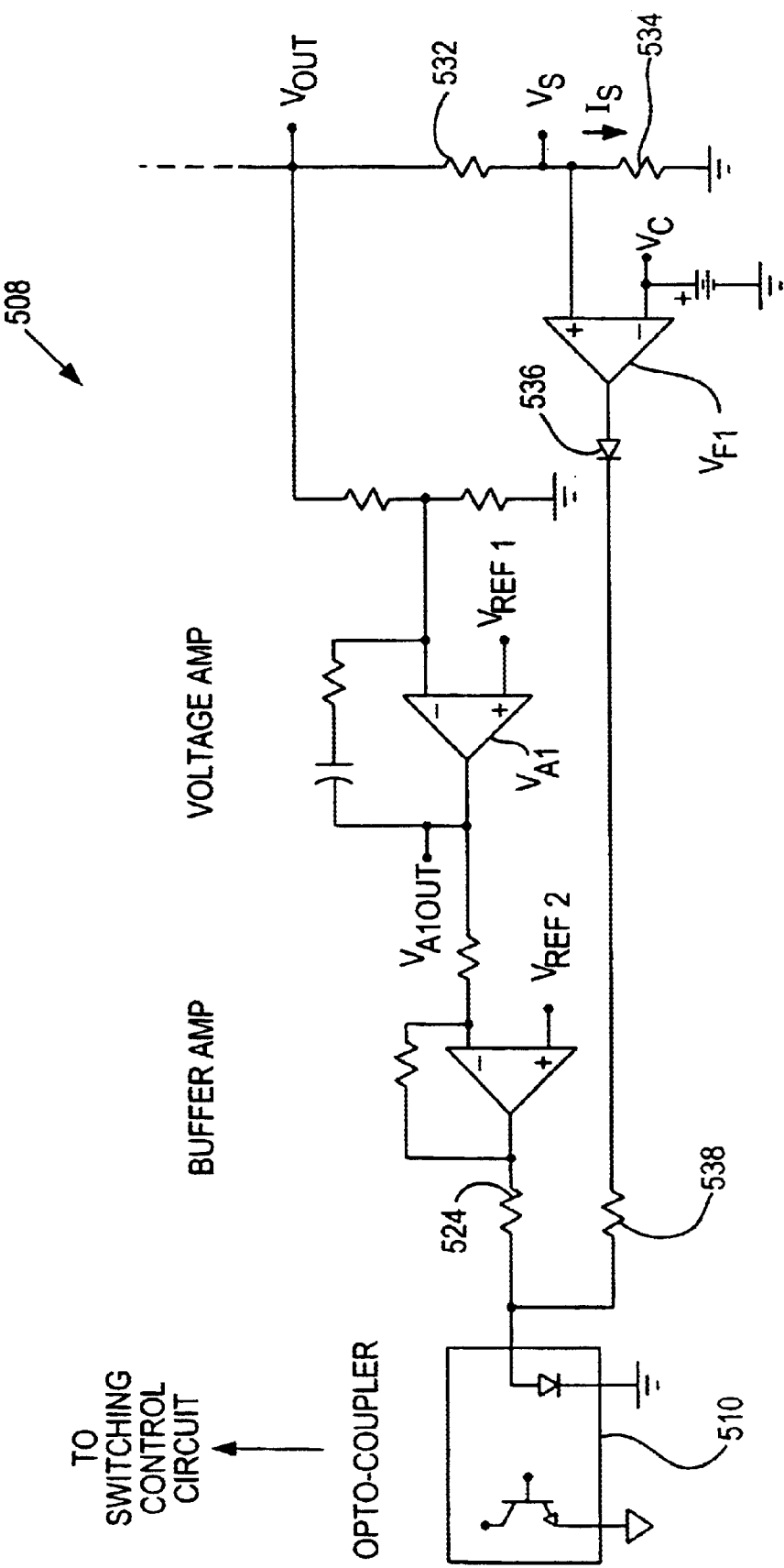
FIG. 5 is a circuit diagram of a known overvoltage comparator embodiment of the feedback control of the power supply of FIG. 1.

FIG. 5 shows a known overvoltage comparator circuit 508 coupled to opto-coupler 510. In general, a comparator compares a reference voltage level to another voltage level and produces a signal when the other voltage level is different than the reference level. Comparator circuit 508 is an integrated circuit that includes amplifier VF1, diode 536, and resistor 538 (note that resistors 538 and 524 can both be replaced with a resistor inside of opto-coupler 510). Reference voltage Vc is coupled to the inverting input of amplifier VF1. Comparator circuit 508 also includes external precision voltage divider resistors 532 and 534 coupled to node VOUT and the non-inverting inverting input of amplifier VF1.

As the voltage at output node VOUT slews up at full speed during start-up or output short release, amplifier VF1 trips when the VOUT voltage reaches the level preset by reference voltage Vc and voltage divider resistors 532 and 534. A control signal is then fed directly to opto-coupler 510, which forwards the signal to switching control circuitry (not shown in FIG. 5), which reduces current to node VOUT. The voltage rise at node VOUT is thus either slowed or stopped.

Overvoltage comparator circuit 508 also has disadvantages. First, it too requires many components in addition to the amplifier VA1-VA2 path components. Second, the precision voltage divider resistors 532 and 534 are expensive, and an I/O package pin is required to couple them to amplifier VF1. Moreover, as in feedforward slew rate detector 408, output voltage ripples at node VOUT are directly coupled to the non-inverting input of amplifier VF1. And again, as the trend in output voltage up-levels continues to decrease, the reference voltage at node Vc has to be set accordingly lower. Thus, voltage ripples caused by large load changes may be of sufficient magnitude to erroneously activate amplifier VF1, causing output oscillation.

Figure 6:
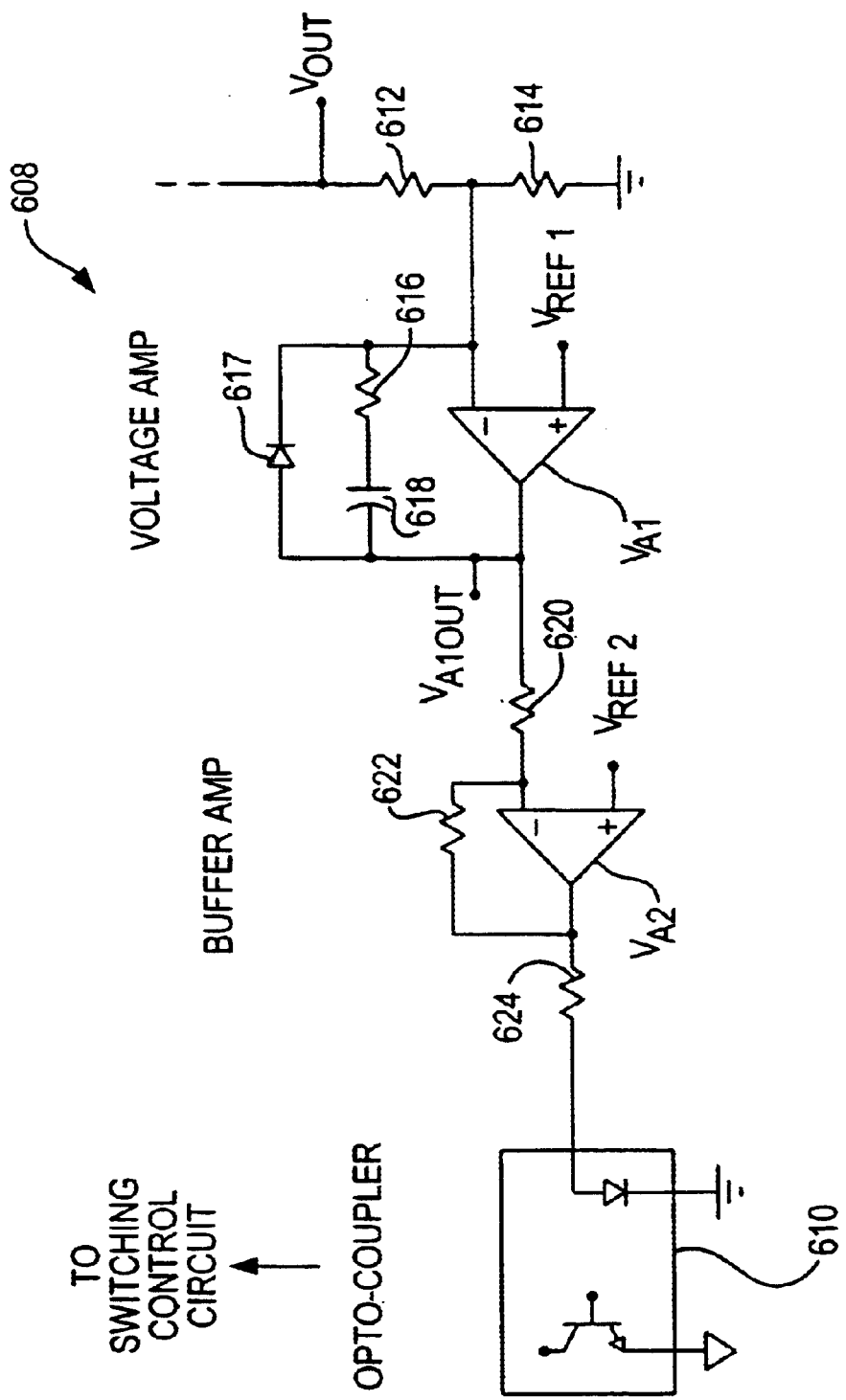
FIG. 6 is a circuit diagram of a known clamping amplifier output embodiment of the feedback control of the power supply of FIG. 1.

FIG. 6 shows a known clamping amplifier output circuit 608 coupled to opto-coupler 610. Clamping circuit 608 includes output divider resistors 612 and 614, high gain voltage amplifier VA1, resistor 616, diode 617, capacitor 618, resistor 620, optional fixed low DC gain buffer amplifier VA2, resistor 622, and resistor 624. Reference voltage VREF1 is coupled to the non-inverting input of amplifier VA1, and reference voltage VREF2 is coupled to non-inverting input of amplifier VA2. The gain of amplifier VA2 is "K," where the value of resistor 622 is equal to K times the value of resistor 620.

As the voltage at output node VOUT slews up at full speed during start-up or output short release, the voltage at node VA1OUT is clamped by diode 617 to about 0.7 volts higher than VREF1. This reduces the voltage swing (from a high state to a low state below VREF2). A shorter voltage swing reduces slew time, which improves response time. Improved response time is needed to prevent output voltage overshoot. However, voltage overshoot is still very likely to occur because the voltage swing at node VA1OUT (referred to hereinafter as ΔVA1OUT) is still too great. Thus, clamping circuit 608 is capable of limiting, but is not likely to prevent, output voltage overshoot.

In sum, none of known circuits 208, 308, 408, 508, and 608 provides a practical, complete solution to output voltage overshoot in an opto-coupler controlled closed-loop DC power supply.

Note that output voltage overshoot is directly proportional to ΔVA1OUT. Thus, reducing ΔVA1OUT to as little as possible, and preferably to zero, results in a feedback circuit that should be able to respond quickly enough to prevent output voltage overshoot.

Figure 7:
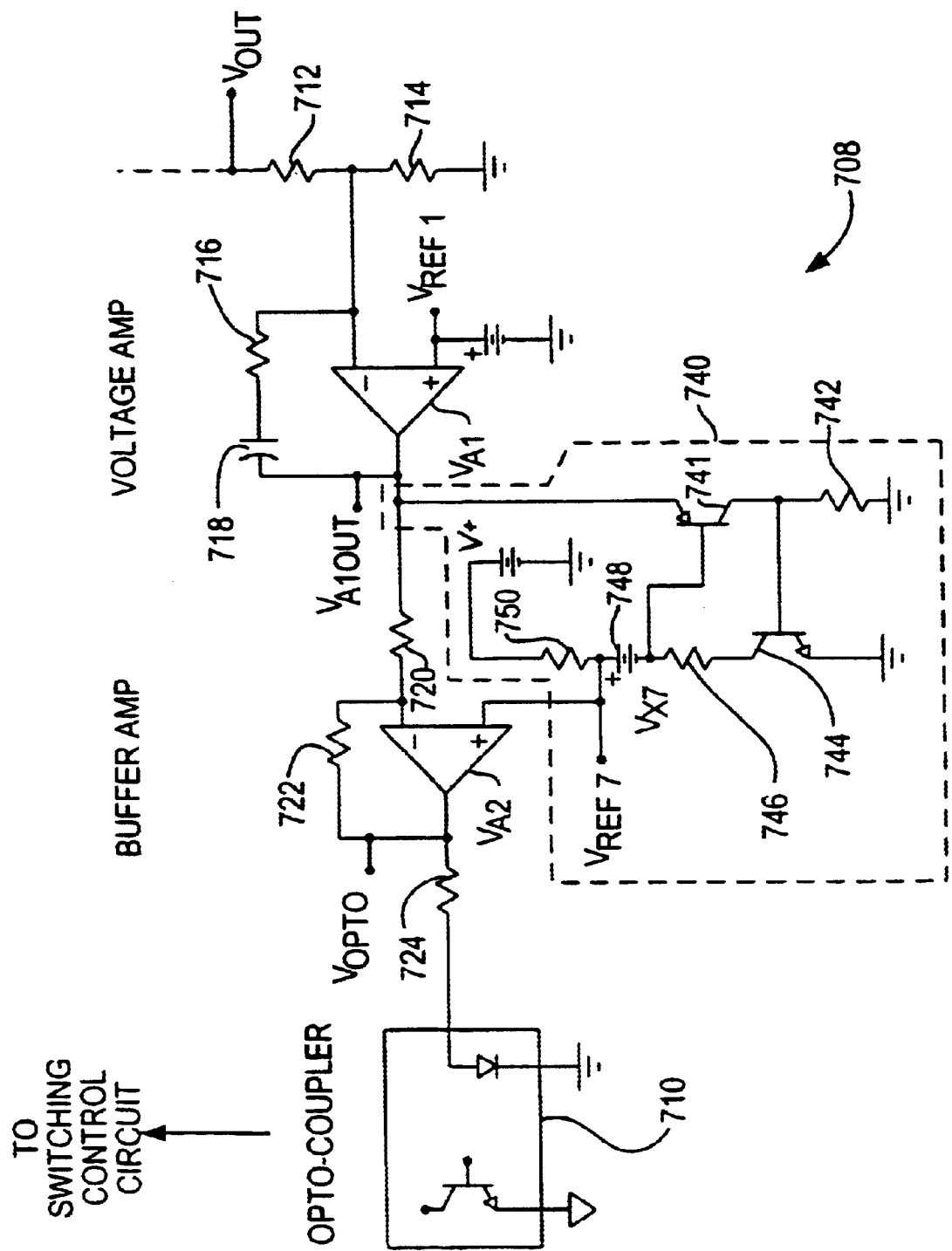
FIG. 7 is a circuit diagram of an exemplary embodiment of a feedback control circuit for reducing output voltage overshoot according to the invention.

FIG. 7 shows feedback control circuit 708 that substantially reduces, if not eliminates, output voltage overshoot during start-up, hard output shorts to ground, and soft output shorts to an undervoltage in an opto-coupler controlled closed-loop power supply in accordance with the invention. Moreover, large output voltage ripples are not likely to interfere adversely with this circuit. Feedback control circuit 708 is preferably coupled to opto-coupler 710 and preferably to a closed-loop power supply's primary circuits (e.g., primary switching control circuit 102, isolation power transformer 104, output rectifiers and filter 106 of FIG. 1).

Feedback control circuit 708 includes output divider resistors 712 and 714, high gain voltage amplifier VA1, resistor 716 and capacitor 718, resistor 720, fixed low DC gain buffer amplifier VA2, resistor 722, and resistor 724 (which may instead be a part of opto-coupler 710). Amplifier VA2 has a gain of "K," where the value of resistor 722 is equal to K times the value of resistor 720. Reference voltage VREF1 is coupled to the non-inverting input of amplifier VA1. Amplifiers VA1 and VA2 can each be the same general purpose op-amp.

Feedback control circuit 708 also advantageously includes a hysteresis circuit 740 coupled to the output of amplifier VA1 and to the non-inverting input of amplifier VA2 in accordance with the invention. Hysteresis circuit 740 includes PNP transistor 741; resistors 742, 746, and 750; NPN transistor 744; DC voltage 748, and DC voltage V+(both are internally-generated circuit voltages). The non-inverting input of amplifier VA2 is coupled to node VREF7 (note that VREF7 is a node and not a voltage source).

As described above with respect to feedback control circuit 208, during start-up or output short release, the voltage at node VOUT is below the specified voltage level resulting in the voltage at node VA1OUT being in a high state. To minimize output overshoot, VA1OUT should be clamped to the minimum high state voltage level necessary to drive the output of opto-coupler 710 to the low state. The time it takes for VA1OUT to switch from its high state to a low state capable of driving the output of opto-coupler 710 to a high state (i.e., generating a control signal) determines the amount of output overshoot that may occur. If that slew time is substantially zero, substantially no overshoot occurs.

Advantageously, hysteresis circuit 740 initially clamps the voltage at VA1OUT to a value that maintains the output of opto-coupler 710 in a low state, yet results in substantially no VA1OUT slew time to drive opto-coupler 710 to a high output state in response to the output voltage at VOUT reaching a preset threshold. This is accomplished by adding hysteresis to the reference voltage coupled to the non-inverting input of amplifier VA2 at node VREF7.

During normal operation (i.e., the voltage at VOUT is at its specified level), transistors 744 and 741 are OFF (i.e., non-conducting) and the voltage at node VREF7 is equal to V+. When the voltage at VOUT is below the specified level for a long enough period, such as during start-up or a hard or soft output short, the voltage at node VA1OUT goes high to a first clamping level determined as follows:

V+−V748+V741(base-emitter)

If, for example, V+=1.5 volts, V748=0.5 volts, and the base-to-emitter voltage drop of transistor 741 is 0.7 volts, the first clamping level is 1.7 volts. As soon as VA1OUT reaches 1.7 volts, transistor 741 turns ON (i.e., becomes conductive). This causes transistor 744 to turn ON, which lowers the voltage at node VREF7 as determined by the values of resistors 750 and 746 and the collector-to-emitter voltage drop across transistor 744. If the total drop is about 0.3 volts, the voltage at VREF7 drops to about 1.2 volts. This pulls down the voltage at VA1OUT by about 0.3 volts to about 1.4 volts.

Thus, as the output voltage rises, but before it reaches its specified level, transistors 741 and 744 are both ON, VA1OUT is 1.4 volts, VREF7 is 1.2 volts, and VOPTO is about 0 volts. In response to the voltage at VOUT reaching its specified level (which is also the threshold voltage level at the inverting input of amplifier VA1 preset by voltage divider resistors 712 and 714), amplifier VA1 activates, forcing the voltage at node VA1OUT to go low. Advantageously, the voltage at node VA1OUT only has to swing down by less than about 50 mV to reduce transistor 741's collector current, causing transistor 744 to turn OFF. This causes the voltage at VREF7 to jump up substantially instantaneously by about 0.3 volts to 1.5 volts. This voltage jump provides substantially instantaneous phase change at amplifier VA2's inputs, forcing the voltage at node VOPTO to jump from about 0 volts to a high state. This high state has a value determined by multiplying 0.3 volts by K, which for a K of about 6 is about 2 volts. This 2-volt jump at the input of opto-coupler 710 transmits substantially instantaneously a control signal to control circuitry, preventing the voltage at VOUT from overshooting.

Advantageously, by presetting the amount of hysteresis on the reference voltage at VREF7, VA1OUT can be clamped at any voltage level required to improve circuit response time such that output voltage overshoot is reduced to substantially zero.

Moreover, during normal operation, the voltage at VREF7 is about 1.5 volts and the voltage at VOPTO ranges from about 1.5 volts (low state) to about 5 volts (high state) for a VA2 gain (K) of about 6. VA1OUT will therefore range between 0.9 volts (low state) and 1.5 volts (high state) and is not likely to approach the 1.7 volt clamping level unless the output voltage drops below the specified level for a long enough period of time (i.e., the time required to charge capacitor 718 to a higher level). Hysteresis circuit 740 therefore remains inactive and substantially transparent to feedback control circuit 708.

Should the voltage at VA1OUT drop below the specified level for the period of time required to charge capacitor 718 to a higher level, hysteresis circuit 740 will activate. Capacitor 718 charges to the higher level as follows: upon the voltage at VOUT dropping to an undervoltage, the voltage at the inverting input of VA1 also drops. This causes the output of VA1 (i.e., VA1OUT) to rise. Capacitor 718 now starts charging beyond its previous steady-state level. If VOUT does not return to its regulated level before VA1OUT reaches the 1.7 volt clamping level, hysteresis circuit 740 activates as described above.

Output voltage ripples at node VOUT advantageously should not affect the voltage at node VA1OUT because of the time constant set by capacitor 718 and resistor 716. Amplifier VA2 can therefore advantageously continue operating in amplifier mode unaffected by very large output voltage ripples at node VOUT.

Figure 8:
FIGS. 8–11 are waveforms of various voltages of the circuit of FIG. 7 according to the invention.
Figure 9:
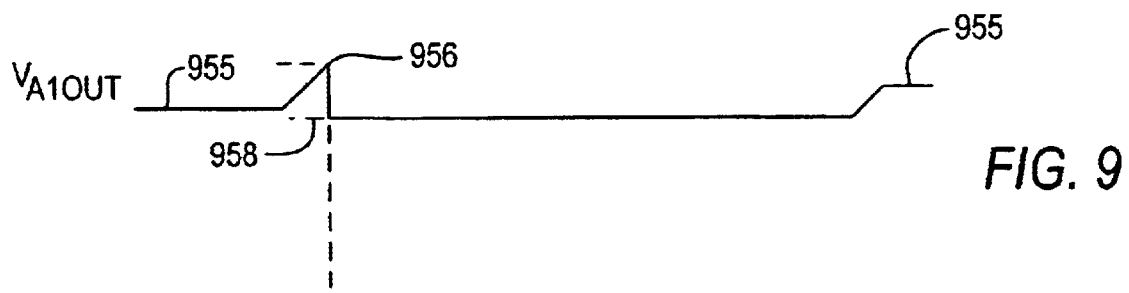
Figure 10:
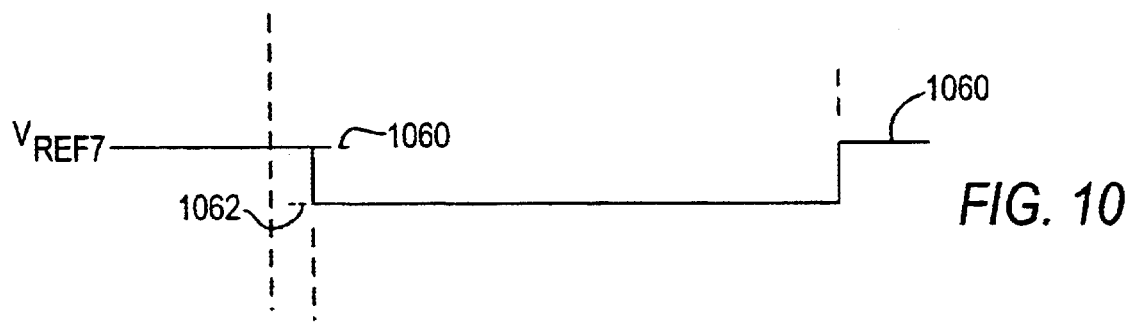
Figure 11:
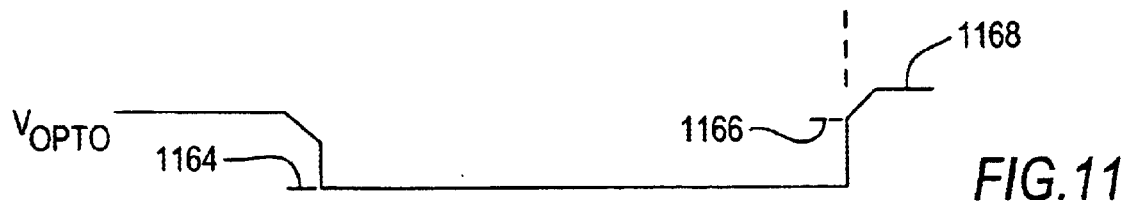

FIGS. 8–11 show various voltage waveforms of feedback control circuit 708. In particular, FIG. 8 shows the voltage waveform at node VOUT, FIG. 9 shows the voltage waveform at node VA1OUT, FIG. 10 shows the voltage waveform at node VREF7, and FIG. 11 shows the voltage waveform at node VOPTO. As shown by waveform portion 852, when the voltage at node VOUT goes below its specified or programmed level 854, the voltage at node VA1OUT rises from a steady-state down level 955 to a first clamped level 956. The voltage at node VREF7, which was initially set at voltage level 1060, drops substantially immediately to voltage level 1062 in response to VA1OUT reaching level 956. The voltage at node VA1OUT responds to VREF7's drop by dropping to voltage level 958. The voltage at node VOPTO switches from a high state to low state 1164 in response to VA1OUT rising to level 956 and advantageously remains at low state 1164 while the voltages at both nodes VREF7 and VA1OUT drop to levels 1062 and 958, respectively. The low voltage state at node VOPTO allows the primary power supply circuits to increase current to node VOUT, driving the output voltage back to its specified level 854 during start-up or after output short release.

In response to the voltage at node VOUT reaching specified level 854 and VA1OUT dropping about 50 mV (not shown in FIG. 9), the voltage at node VREF7 substantially instantaneously jumps to level 1060, causing the voltage at node VOPTO to jump to high state 1166. This results in the primary power supply circuits substantially immediately decreasing the amount of current to node VOUT, thus substantially, if not completely, preventing output voltage overshoot at node VOUT. The voltage at VOPTO continues to rise to its steady-state level 1168. The invention advantageously provides the substantially instantaneous jump from level 1164 to level 1166. In response to the output voltage reaching its specified value, the voltage at VA1OUT returns to its steady-state down level 955.

In one embodiment of the invention, the voltage levels shown in FIGS. 8–11 can have the following values:

level 854=3.3 volts level 956=1.7 volts level 958=1.4 volts level 1060=1.5 volts level 1062=1.2 volts level 1164=0 volts level 1166=2.0 volts Note that these values are merely illustrative. Different values may be used in accordance with other conditions and applications.

Also note that feedback control circuits of the invention can be used in circuits and components other than an opto-coupler controlled closed-loop power supply. For example, circuits of the invention can be included in most feedback control systems with a main loop compensating network in which the opto-coupler can be replaced with a PWM (pulse-width-modulator) comparator and amplifier VA2 can be operated as a non-inverting amplifier, as shown in FIG. 12.

Figure 12:
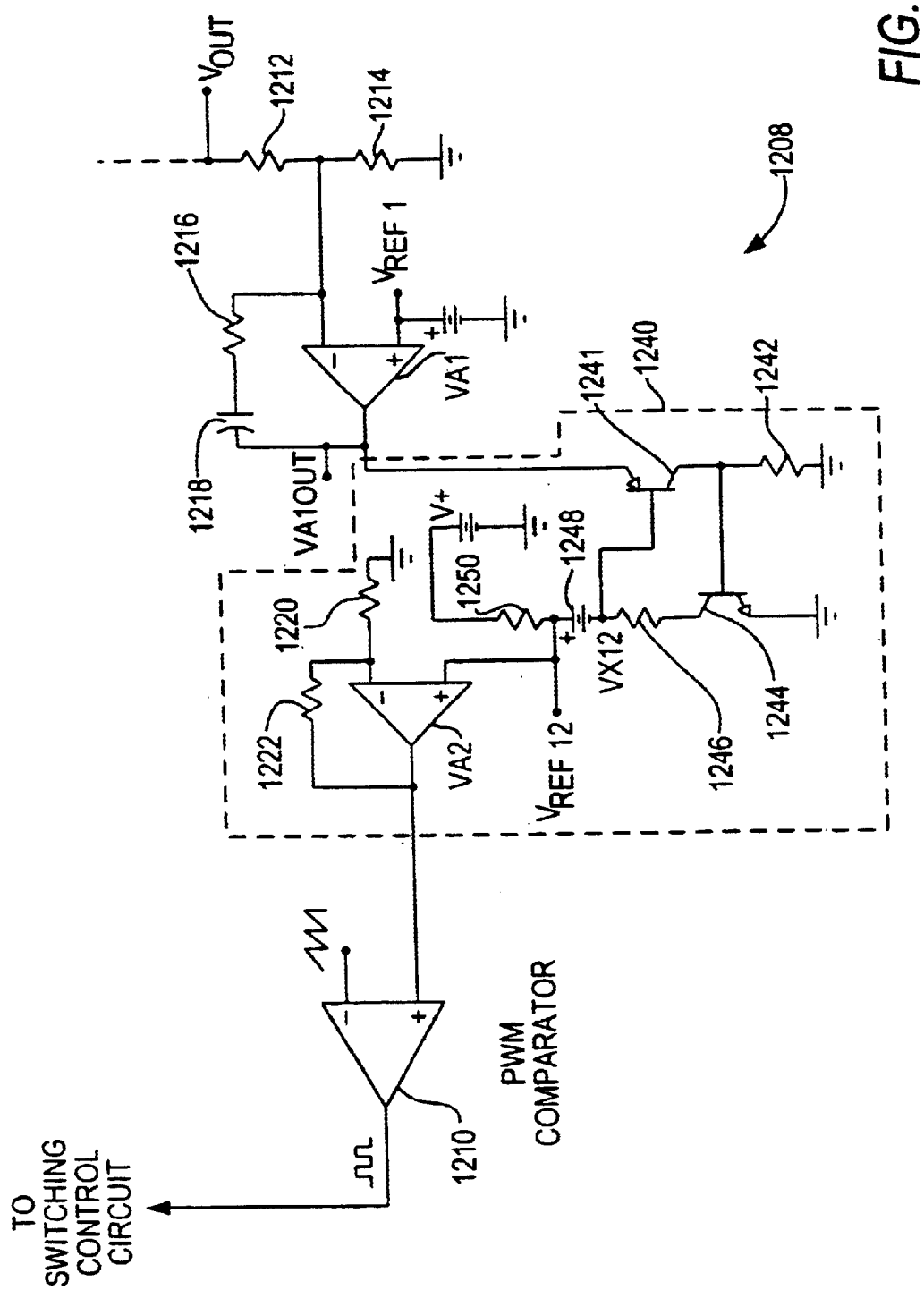
FIG. 12 is a circuit diagram of another exemplary embodiment of a feedback control circuit for reducing voltage overshoot according to the invention.

FIG. 12 shows another embodiment of a feedback control circuit in accordance with the invention. Feedback control circuit 1208 can be part of general purpose PWM DC-to-DC converter and includes output divider resistors 1212 and 1214, high gain voltage amplifier VA1, and resistor 1216 and capacitor 1218, which form a loop filter. Circuit 1208 also advantageously includes hysteresis circuit 1240, which includes PNP transistor 1241; resistors 1242, 1246, and 1250; NPN transistor 1244; DC voltage 1248, DC voltage V+(both are internally-generated circuit voltages). Hysteresis circuit 1240 preferably also includes non-inverting amplifier VA2 and resistors 1220 and 1222. The non-inverting input of amplifier VA2 is coupled to node VREF12 (note that VREF12 is a node and not a voltage source) and the inverting input is grounded. The output of VA2 is coupled to the non-inverting input of PWM comparator 1210, which controls the duty cycle of the DC-to-DC converter (primary circuits of which are not shown). The inverting input of PWM comparator 1210 is coupled to a sawtooth ramp signal.

The operation of hysteresis circuit 1240 with respect to the voltages at node VREF12 and node VA1OUT is substantially identical to hysteresis circuit 740. Thus, during normal operation (VOUT is at its specified level), VA1OUT is low, VREF12 is at V+, and the output of VA2 is high. PWM comparator 1210 produces a narrow output pulse that results in a preferably minimum duty cycle (reducing current to VOUT). When the voltage at VOUT drops below its specified level for a long enough period, VA1OUT goes high, VREF12 drops to a lower voltage level, the output of VA2 goes low, and PWM comparator 1210 produces a wide output pulse that results in a preferably maximum duty cycle (increasing current to VOUT). (The terms "minimum" and "maximum" are relative, depending on the widths of the produced comparator output pulse as determined by the voltages of the sawtooth ramp signal and the output of VA2.) In response to VOUT reaching its specified voltage level, VREF12 jumps substantially instantaneously back up to V+, which reduces the duty cycle, substantially preventing further increases in the voltage level at VOUT. In sum, feedback control circuit 1208 has the same advantages as feedback control circuit 708.

Thus it is seen that circuits are provided that reduce output voltage overshoot under various conditions. One skilled in the art will appreciate that the invention can be practiced by other than the described embodiments, which are presented for purposes of illustration and not of limitation, and the invention is limited only by the claims which follow.

I claim:

1. A method of reducing output voltage overshoot at an output of an integrated circuit, said method comprising:

setting a reference voltage to a first voltage value;

producing a first voltage having a second voltage value after setting said reference voltage and in response to an output voltage at said output being below a threshold, said second value higher than said first value;

decreasing said reference voltage to a third voltage value in response to said first voltage being at said second value and before said output voltage reaches said threshold;

decreasing said first voltage to a fourth value in response to said reference voltage decreasing to said third value and before said output voltage reaches said threshold, said fourth value greater than said third value;

increasing said reference voltage to said first value in response to said output voltage reaching said threshold; and generating a control signal to prevent said output voltage from rising further in response to said reference voltage increasing to said fourth value.

2. The method of claim 1 wherein said producing comprises triggering an operational amplifier to output a first voltage having a second voltage value after setting said reference voltage and in response to an output voltage at said output being below a threshold, said second value higher than said first value.

3. The method of claim 1 wherein said decreasing said reference voltage comprises decreasing said reference voltage to a third voltage value by turning on at least one transistor in response to said first voltage being at said second value and before said output voltage reaches said threshold.

4. The method of claim 1 wherein said increasing comprises increasing said reference voltage to said first value by turning off a transistor in response to said output voltage reaching said threshold.

5. A method of reducing output voltage overshoot in an integrated circuit, said method comprising:

varying a first voltage from a first voltage value to a lower second voltage value and then back to said first value, said varying from said first value to said second value occurring while an output voltage is below a threshold and said varying back to said first value occurring in response to said output voltage reaching said threshold;

varying a second voltage from a third voltage value to a fourth voltage value in response to said first voltage varying from said first value to said second value and to said output voltage being below said threshold, said third value higher than said first value and said fourth value higher than said second value but lower, than said first value; and generating a signal to reduce output voltage overshoot in response to said first voltage returning back to said first value.

6. The method of claim 5 wherein said varying a first voltage comprises varying a first voltage to a non-inverting input of an operational amplifier from a first voltage value to a lower second voltage value and then back to said first value, said varying from said first value to said second value occurring while an output voltage is below a threshold and said varying back to said first value occurring in response to said output voltage reaching said threshold.

7. The method of claim 5 wherein said varying a second voltage comprises varying a second voltage at an inverting input of an operational amplifier from a third voltage value to a fourth voltage value in response to said first voltage varying from said first value to said second value and to said output voltage being below said threshold, said third value higher than said first value and said fourth value higher than said second value but lower than said first value.

8. The method of claim 5 wherein said generating comprises outputting a signal at an output of an operational amplifier to reduce output voltage overshoot in response to said first voltage at a non-inverting input of said amplifier returning back to said first value, said second voltage being at an inverting input of said amplifier.

9. A method of reducing output voltage overshoot in an integrated circuit, said method comprising:
- inputting a first voltage to a non-inverting input of an integrated circuit amplifier before an output voltage reaches a threshold;
- inputting a second voltage, higher than said first, to an inverting input of said integrated circuit amplifier before said output voltage reaches said threshold;
- inputting a third voltage, lower than said first voltage, to said non-inverting input before said output voltage reaches said threshold;
- inputting a fourth voltage to said inverting input before said output voltage reaches said threshold, said fourth voltage lower than said second voltage and higher than said third voltage; and
- inputting said first voltage to said non-inverting input in response to said output voltage reaching said threshold; wherein:
- said amplifier outputs a signal in response to inputting both said fourth and first voltages, said signal causing said output voltage to stop rising.

10. The method of claim 9 further comprising producing said first and third voltages with a hysteresis circuit.

11. The method of claim 9 further comprising producing said second and fourth voltages at the output of a second operational amplifier coupled to a hysteresis circuit.

12. A feedback control circuit operative to generate a signal in response to a voltage reaching a threshold level, said circuit comprising:
- a first amplifier having an output, an inverting input, and a non-inverting input, said non-inverting input coupled to a reference voltage having a constant voltage value, said inverting input operative to receive said voltage;
- a second amplifier having an output, an inverting input, and a non-inverting input, said second amplifier inverting input coupled to said first amplifier output, said second amplifier output operative to providing said generated signal; and
- a hysteresis circuit coupled to said first amplifier output and to said second amplifier non-inverting input.

13. The feedback control circuit of claim 12 wherein said hysteresis circuit comprises:
- a PNP transistor having a collector, a base, and an emitter, said emitter coupled to said first amplifier output;
- a first resistor having first and second terminals, said first terminal coupled to said PNP transistor collector;
- a second resistor having first and second terminals, said first terminal operative to be coupled to a DC voltage, said second terminal coupled to said second amplifier non-inverting input;
- a DC voltage source having a positive terminal and a negative terminal, said positive terminal coupled to said second amplifier non-inverting input, said negative terminal coupled to said PNP transistor base;
- a third resistor having first and second terminals, said first terminal coupled to said negative terminal; and
- an NPN transistor having an emitter, a collector coupled to said second terminal of said third resistor, and a base coupled to said PNP transistor emitter.

14. The feedback control circuit of claim 13 wherein said DC voltage source is 0.5 volts.

15. The feedback control circuit of claim 13 wherein said DC voltage is 1.5 volts.

16. The feedback control circuit of claim 12 wherein said first amplifier comprises:
- an operational amplifier having said first amplifier output, said first amplifier non-inverting input and said first amplifier inverting input;
- a capacitor; and
- a resistor; wherein:
- said capacitor and said resistor are coupled in series between said first amplifier output and said first amplifier inverting input.

17. The feedback control circuit of claim 12 wherein said second amplifier comprises:
- an operational amplifier having said second amplifier output, said second amplifier non-inverting input and said second amplifier inverting input; and
- a resistor; wherein:
- said resistor is coupled in series between said second amplifier output and said second amplifier inverting input.

18. A closed-loop DC power supply comprising:
- a switching control circuit having a duty cycle that determines the amount of current provided to an output of said power supply;
- a transformer having input coupled to said switching control circuit and an output operative to provide a low AC voltage having high frequency;
- rectifier and filtering circuitry having an input coupled to said transformer output and having an output operative to provide a regulated DC voltage to said power supply output;
- an opto-coupler having an input and an output, said output coupled to said switching control circuit; and
- a feedback control circuit having an input coupled to said power supply output and having an output coupled to said opto-coupler, said feedback circuitry comprising first and second operational amplifiers and a hysteresis circuit coupled to an output of said first operational amplifier and to a non-inverting input of said second operational amplifier, said first operational amplifier having an inverting input coupled to said power supply output, said second operational amplifier having an output coupled to said feedback circuitry output.

19. The DC power supply of claim 18 wherein said hysteresis circuit comprises:
- a PNP transistor having a collector, a base, and an emitter, said emitter coupled to said first amplifier output;
- a first resistor having first and second terminals, said first terminal coupled to said PNP transistor collector;
- a second resistor having first and second terminals, said first terminal operative to be coupled to a DC voltage, said second terminal coupled to said second amplifier non-inverting input;
- a DC voltage source having a positive terminal and a negative terminal, said positive terminal coupled to said second amplifier non-inverting input, said negative terminal coupled to said PNP transistor base;
- a third resistor having first and second terminals, said first terminal coupled to said negative terminal; and
- an NPN transistor having an emitter, a collector coupled to said second terminal of said third resistor, and a base coupled to said PNP transistor emitter.

20. Apparatus for reducing output voltage overshoot at an output of an integrated circuit, said apparatus comprising:
- means for setting a reference voltage to a first voltage value;
- means for producing a first voltage having a second voltage value after setting said reference voltage and in response to an output voltage at said output being below a threshold, said second value higher than said first value;

means for decreasing said reference voltage to a third voltage value in response to said first voltage being at said second value and before said output voltage reaches said threshold;

means for decreasing said first voltage to a fourth value in response to said reference voltage decreasing to said third value and before said output voltage reaches said threshold, said fourth value greater than said third value;

means for increasing said reference voltage to said first value in response to said output voltage reaching said threshold; and means for generating a control signal to prevent said output voltage from rising further in response to said reference voltage increasing to said fourth value.

21. Apparatus for reducing output voltage overshoot in an integrated circuit, said apparatus comprising:

means for varying a first voltage from a first voltage value to a lower second voltage value and then back to said first value, said varying from said first value to said second value occurring while an output voltage is below a threshold and said varying back to said first value occurring in response to said output voltage reaching said threshold;

means for varying a second voltage from a third voltage value to a fourth-voltage value in response to said first voltage varying from said first value to said second value and to said output voltage being below said threshold, said third value higher than said first value and said fourth value higher than said second value but lower than said first value; and means for generating a signal to reduce output voltage overshoot in response to said first voltage returning back to said first value.

* * * * *